(12) United States Patent
Mangina et al.

(10) Patent No.: US 9,817,414 B2
(45) Date of Patent: Nov. 14, 2017

(54) UNDERSHOOT REDUCTION

(71) Applicant: Texas Instruments Incorporated, Dallas, TX (US)

(72) Inventors: Naga Venkata Prasadu Mangina, Bangalore (IN); Biranchinath Sahu, Sunnyvale, CA (US); Pradeep V S R Pydah, Bangalore (IN); Nandakishore Raimar, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 14 days.

(21) Appl. No.: 14/685,590

(22) Filed: Apr. 13, 2015

(65) Prior Publication Data
US 2016/0299520 A1    Oct. 13, 2016

(51) Int. Cl.
*H02M 3/156* (2006.01)
*G05F 1/575* (2006.01)

(52) U.S. Cl.
CPC ............ *G05F 1/575* (2013.01); *H02M 3/156* (2013.01)

(58) Field of Classification Search
None
See application file for complete search history.

(56) References Cited

U.S. PATENT DOCUMENTS

| 6,456,170 | B1* | 9/2002 | Segawa ............... H03K 3/0231 327/50 |
| 6,970,392 | B1* | 11/2005 | Au ............................ G06F 5/14 365/221 |
| 7,423,414 | B1 | 9/2008 | Culpepper et al. |
| 7,982,445 | B1 | 7/2011 | Xin-LeBlanc |
| 8,823,419 | B1* | 9/2014 | O'Leary ................. H03K 5/22 327/205 |
| 2010/0085110 | A1* | 4/2010 | Jiao .......................... G05F 1/46 327/536 |
| 2011/0037448 | A1* | 2/2011 | Liu ....................... H02M 3/158 323/284 |
| 2013/0293207 | A1* | 11/2013 | Wei .......................... G05F 1/46 323/272 |

FOREIGN PATENT DOCUMENTS

KR    20030055995 A    4/2003

OTHER PUBLICATIONS

Search Report for PCT Application No. PCT/US16/27336 dated Sep. 1, 2016 (1 page).

* cited by examiner

*Primary Examiner* — Jeffrey Gblende
(74) *Attorney, Agent, or Firm* — William B. Kempler; Charles A. Brill; Frank D. Cimino

(57) ABSTRACT

Undershoot reduction circuitry includes, for example, a first comparator, a second comparator, and a controller. The first comparator is operable for comparing an indication of a power supply voltage output against a first threshold. The second comparator is operable for comparing an indication of the power supply voltage output against a second threshold. The controller is operable for generating a first power control signal to raise the power supply voltage output when the indication of the power supply voltage output has a first slope and crosses the first threshold and to lower the power supply voltage output when the indication of the power supply voltage output has an opposite slope and crosses the second threshold.

17 Claims, 6 Drawing Sheets

UNDERSHOOT REDUCTION

BACKGROUND

Many applications include integrated circuits that are powered by power supplies having voltage regulation. Some regulators (such as direct-current-to-direct-current regulators) include undershoot reduction circuitry to achieve regulation of power supply outputs. For example, when the voltage of a power supply output falls below a certain reference voltage, the undershoot reduction circuitry turns on a nonlinear control fast control loop for applying power to raise the voltage of a power supply output. The nonlinear fast control loop is turned off by the undershoot reduction circuitry after the output voltage rises above the reference voltage plus a hysteresis value of the comparator used. This approach often results in an overshoot of the output voltage due to hysteresis and extra energy dissipated in the inductor that is part of the power supply output LC filter. The overshoot problem is compounded in multiphase regulators where more than one such regulated phase is turned on in response to increased load demands.

SUMMARY

The problems noted above can be solved using undershoot reduction circuitry that includes, for example, a first comparator, a second comparator, and a controller. The first comparator is operable for comparing an indication of an output (e.g. a, regulated power supply voltage output) against a first threshold. The second comparator is operable for comparing an indication of the regulated power supply voltage output against a second threshold. The controller is operable for generating a first power control signal to raise the power supply voltage output when the indication of the power supply voltage output has a first slope and crosses the first threshold and to lower the power supply voltage output when the indication of the power supply voltage output has an opposite slope and crosses the second threshold.

This Summary is submitted with the understanding that it is not be used to interpret or limit the scope or meaning of the claims. Further, the Summary is not intended to identify key features or essential features of the claimed subject matter, nor is it intended to be used as an aid in determining the scope of the claimed subject matter.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be example of that embodiment, and not intended to intimate that the scope of the disclosure, including the claims, is limited to that embodiment.

Certain terms are used throughout the following description—and claims—to refer to particular system components. As one skilled in the art will appreciate, various names may be used to refer to a component or system. Accordingly, distinctions are not necessarily made herein between components that differ in name but not function. Further, a system can be a sub-system of yet another system. In the following discussion and in the claims, the terms "including" and "comprising" are used in an open-ended fashion, and accordingly are to be interpreted to mean "including, but not limited to . . . ." Also, the terms "coupled to" or "couples with" (and the like) are intended to describe either an indirect or direct electrical connection. Thus, if a first device couples to a second device, that connection can be made through a direct electrical connection, or through an indirect electrical connection via other devices and connections. The term "portion" can mean an entire portion or a portion that is less than the entire portion. The term "calibration" can include the meaning of the word "test." The term "input" can mean either a source or a drain (or even a control input such as a gate where context indicates) of a PMOS (positive-type metal oxide semiconductor) or NMOS (negative-type metal oxide semiconductor) transistor. The term "pulse" can mean a portion of waveforms such as "squarewave" or "sawtooth" waveforms.

Figure 1:
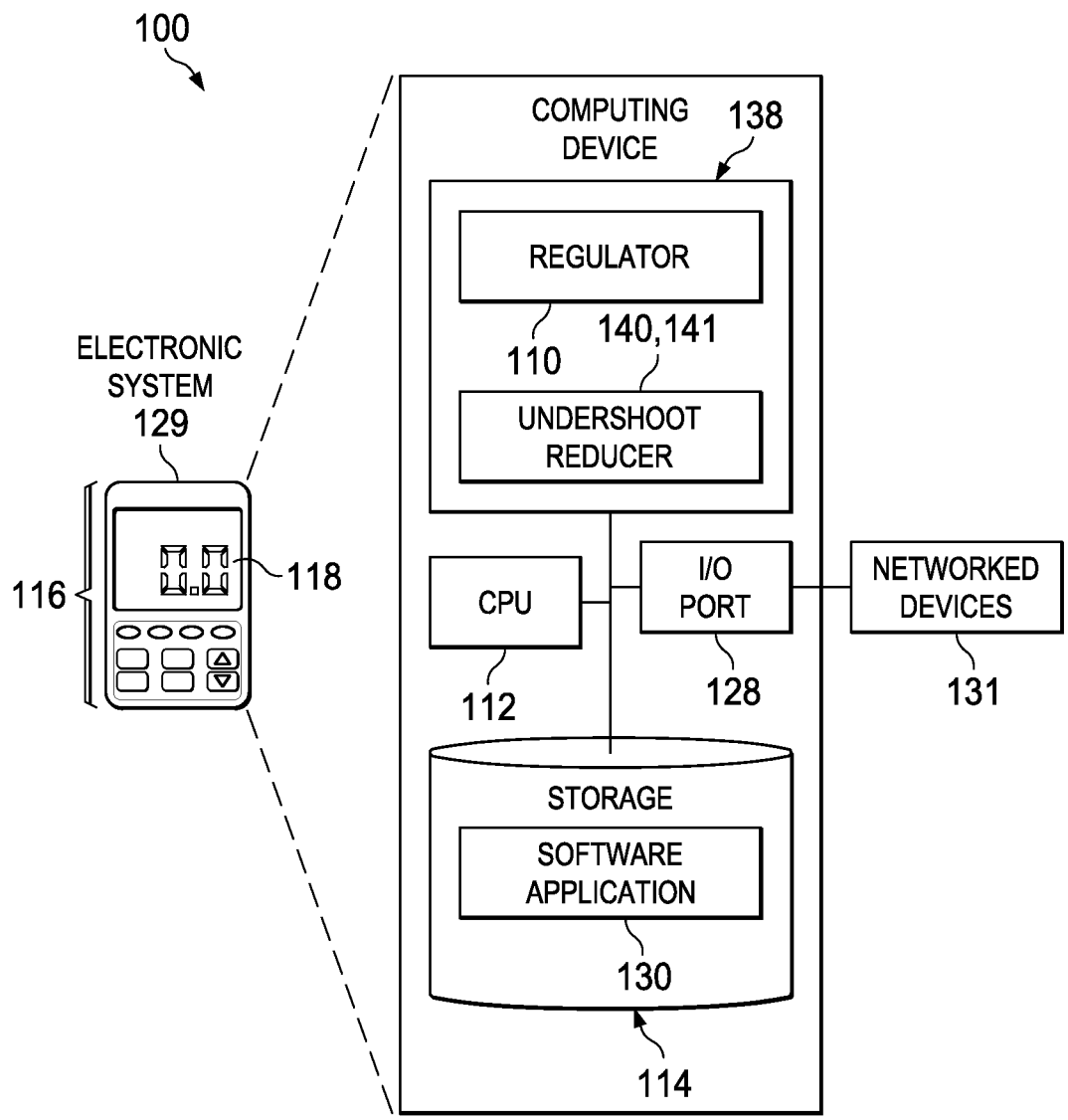
FIG. 1 shows an illustrative electronic device in accordance with example embodiments of the disclosure.

FIG. 1 shows an illustrative computing device 100 in accordance with embodiments of the disclosure. For example, the computing device 100 is, or is incorporated into, or is coupled (e.g., connected) to an electronic system 129, such as a computer, electronics control "box" or display, communications equipment (including transmitters or receivers), or any type of electronic system operable to process information.

In some embodiments, the computing device 100 comprises a megacell or a system-on-chip (SoC) which includes control logic such as a CPU 112 (Central Processing Unit), a storage 114 (e.g., random access memory (RAM)) and a power supply 110. The CPU 112 can be, for example, a CISC-type (Complex Instruction Set Computer) CPU, RISC-type CPU (Reduced Instruction Set Computer), MCU-type (Microcontroller Unit), or a digital signal processor (DSP). The storage 114 (which can be memory such as on-processor cache, off-processor cache, RAM, flash memory, or disk storage) stores one or more software applications 130 (e.g., embedded applications) that, when executed by the CPU 112, perform any suitable function associated with the computing device 100.

The CPU 112 comprises memory and logic that store information frequently accessed from the storage 114. The computing device 100 is often controlled by a user using a UI (user interface) 116, which provides output to and receives input from the user during the execution the software application 130. The output is provided using the display 118, indicator lights, a speaker, vibrations, and the like. The input is received using audio and/or video inputs (using, for example, voice or image recognition), and electrical and/or mechanical devices such as keypads, switches, proximity detectors, gyros, accelerometers, and the like.

The CPU 112 and power supply 110 are coupled to I/O (Input-Output) port 128, which provides an interface that is configured to receive input from (and/or provide output to) networked devices 131. The networked devices 131 can include any device (including test equipment) capable of point-to-point and/or networked communications with the computing device 100. The computing device 100 is typically coupled to peripherals and/or computing devices, including tangible, non-transitory media (such as flash memory) and/or cabled or wireless media. These and other input and output devices are selectively coupled to the computing device 100 by external devices using wireless or cabled connections. The storage 114 is accessible, for example, by the networked devices 131. The CPU 112, storage 114, and power supply 110 are also optionally coupled to an external power supply (not shown), which is configured to receive power from a power source (such as a battery, solar cell, "live" power cord, inductive field, fuel cell, capacitor, and the like).

The computing device 100 includes a power module 138. The power module 138 includes at least one regulator 110. The regulator 110 is operable for generating at least one voltage output that is protected by undershoot reducer 140. In the embodiment discussed below with respect to FIG. 2, the undershoot reducer 140 includes two comparators, wherein each comparator has a separate voltage reference. The first comparator compares a regulated voltage (such as an indication of a power supply voltage output) against a first voltage reference when the regulated voltage has a negative-going slope. The second comparator compares a regulated voltage against a second voltage reference when the regulated voltage has a positive-going slope.

The independent thresholding of the undershoot reducer 140 is used, for example, to avoid potential problems associated with the fixed hysteresis of a single comparator. (The degree of hysteresis of a given comparator is determined at the time of design and/or manufacture.) In contrast, the independent thresholding permits designs having (e.g., virtual) negative hysteresis. For example, the negative hysteresis (e.g., provided by independent thresholds of two comparators) helps reduce wasted energy. Energy is conserved for example by reducing output overshoot voltages (where the corrected voltage exceeds a target voltage) and the undershoot voltages (where the overshot voltage drops substantially below the target voltage as the feedback control mechanism of the output voltage attempts to "zero in" on the target voltage) of the power module 138.

Figure 2A:
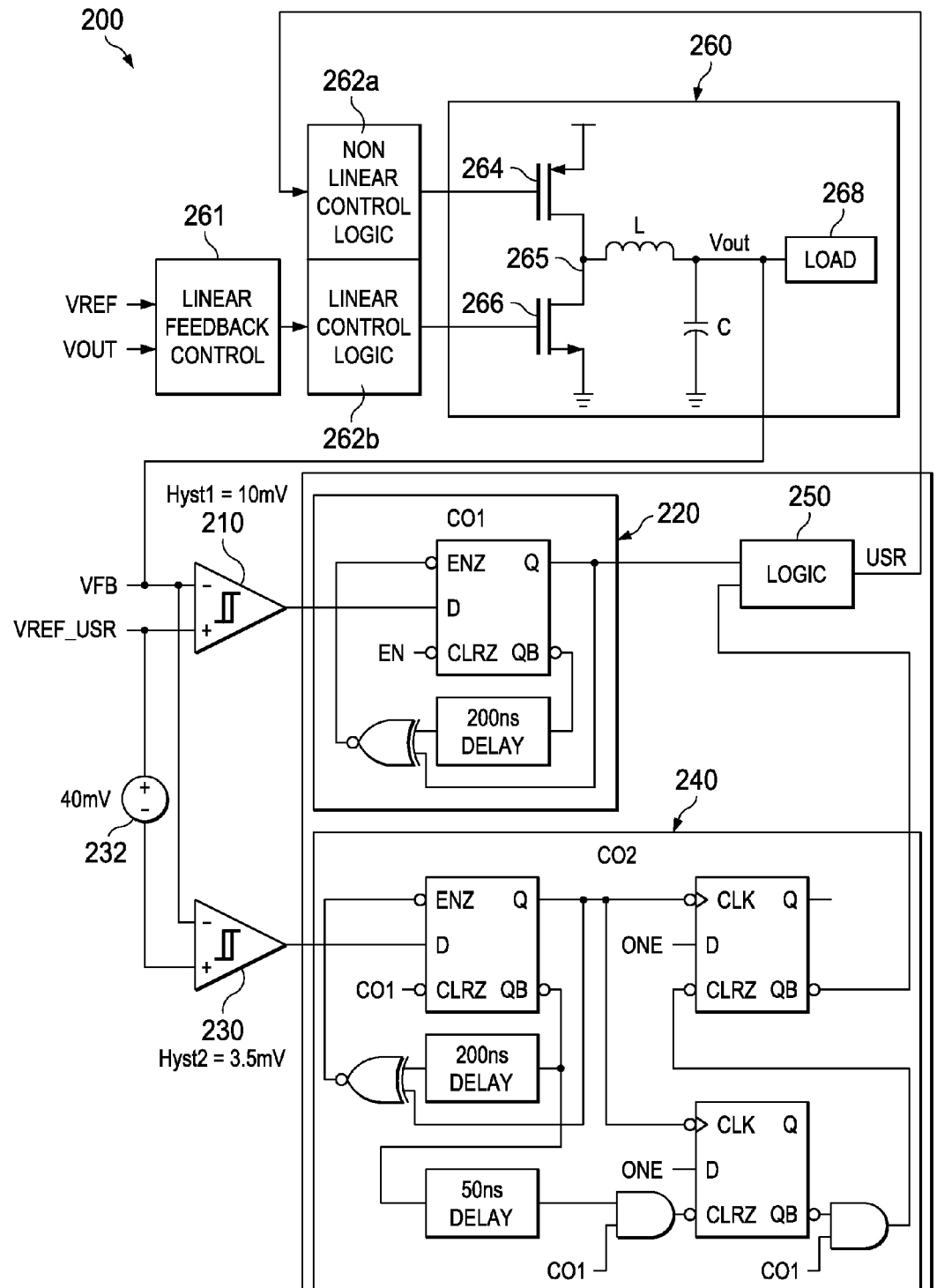
FIG. 2a is a schematic of an independent threshold undershoot reducer in accordance with example embodiments of the disclosure.

FIG. 2a is a schematic of an independent threshold undershoot reducer system in accordance with example embodiments of the disclosure. The independent threshold undershoot reducer system 200 is undershoot reduction circuitry such as the independent threshold undershoot reducer 140. The independent threshold undershoot reducer system 200 includes a first comparator 210, a first comparator latch 220, a second comparator 230, a second comparator latch 240, a state machine 218, and a power converter 260. Such included components are typically formed on a common substrate.

The first comparator 210 is coupled to voltage feedback (VFB) signal at the inverting input and is coupled to the undershoot reduction voltage reference (VREF_USR) at the non-inverting input. The first comparator 210 has a hysteresis of 10 millivolts, for example, which affects when the output of the first comparator 210 toggles in response to comparisons of the VFB and the VREF_USR the input signals. The comparator 210 is arranged to maintain any active high output for a selected delay (e.g., around 200 nanoseconds as shown in the example). The selected delay helps ensure that the signal USR is asserted for a duration at least as long as the selected delay.

The output of the first comparator 210 is coupled to an input of the first comparator latch 220 of the state machine 218. The first comparator latch 220 produces the first comparator output (CO1) signal in response to the output of the first comparator 210 as described below with reference to FIG. 3. The state of the first comparator latch 220 is initially set in response to an assertion of the Enable signal at a "clear-negative" pin of an internal latch of the first comparator latch 220.

The second comparator 230 is coupled to voltage feedback (VFB) signal at the inverting input and is coupled to the offset undershoot reduction voltage reference (offset VREF_USR) signal at the non-inverting input. The VREF_USR-OFFSET is offset downwards by 40 millivolts (or other such selected value) by the voltage source 232. The second comparator 230 has a hysteresis of 3.5 millivolts, for example, which affects when the output of the second comparator 230 toggles in response to comparisons of the VFB and the offset VREF_USR the input signals.

The second comparator can have a hysteresis that is the same as or is different from the hysteresis of the first comparator. In other example embodiments for example, the hysteresis of the first comparator 210 and the hysteresis of the second comparator 230 are both 10 millivolts. The comparator 230 is arranged to maintain minimum active high or low of signal CO2 for selected delay (e.g., for at least 200 nanoseconds), which helps ensure that the signal USR is asserted for at least for selected delay time span.

The output of the second comparator 230 is coupled to an input of the second comparator latch 240 of the state machine 218. The second comparator latch 240 produces the second comparator output (CO2) signal in response to the output of the second comparator 230 as described below with reference to FIG. 3. Accordingly, state of the second comparator latch 240 is initially set in response the current state of the first comparator latch 220 (e.g., via signal CO1). The CO1 and CO2 signals are input to the logic 250 of the state machine 218, which generates the the undershoot reduction (USR) signal in accordance with the waveforms described below with reference to FIG. 3.

The USR signal is received by the non-linear control logic 262a, whereas a linear feedback control 261 circuit is responsive to the received voltage reference signal (Vref) and the power supply voltage output (Vout) to drive the linear control logic 262b. The non-linear control logic 262a and the linear control logic 262b are operable to drive power transistors 264 and 266 of power converter 260 in accordance of the values of the inductor L and the capacitor C and the respective signals received by the non-linear control logic 262a and the linear control logic 262b. The power transistor 264 is a "high-side" field-effect transistor (FET), whereas the power transistor 266 is a "low-side" FET. A first terminal of an inductor L is coupled between the power transistor 264 and the power transistor 266 at node 265. The logic 262 is operable for applying power to the inductor L or shunting power from the inductor L. A second terminal of the inductor L is coupled to the high side of capacitor C and to the output voltage node Vout. In operation, extra power is typically applied to the inductors L in response to the assertion of the signal USR by way of the non-linear control logic 262a.

A load (the amount of which typically varies during operation) is optionally coupled to the output voltage node Vout. The output voltage node of the power converter 260 is coupled to the respective inverting inputs of the first comparator 210 and the second comparator 230 as signal VFB.

The second comparator latch 240 is responsive to the CO1 signal output by the first comparator latch 220. Accordingly, the first comparator 210 is operable for performing a first comparison when the signal VFB has a first (e.g., negative) slope and the second converter 230 is operable for performing a second comparison when the signal VFB has a second (e.g., positive) slope. For example, the two comparisons (each using a separate, predetermined threshold) allow the timing of the undershoot reduction circuitry for the output voltage to be determined independently of the timing of the command to increase the output voltage.

Figure 2B:
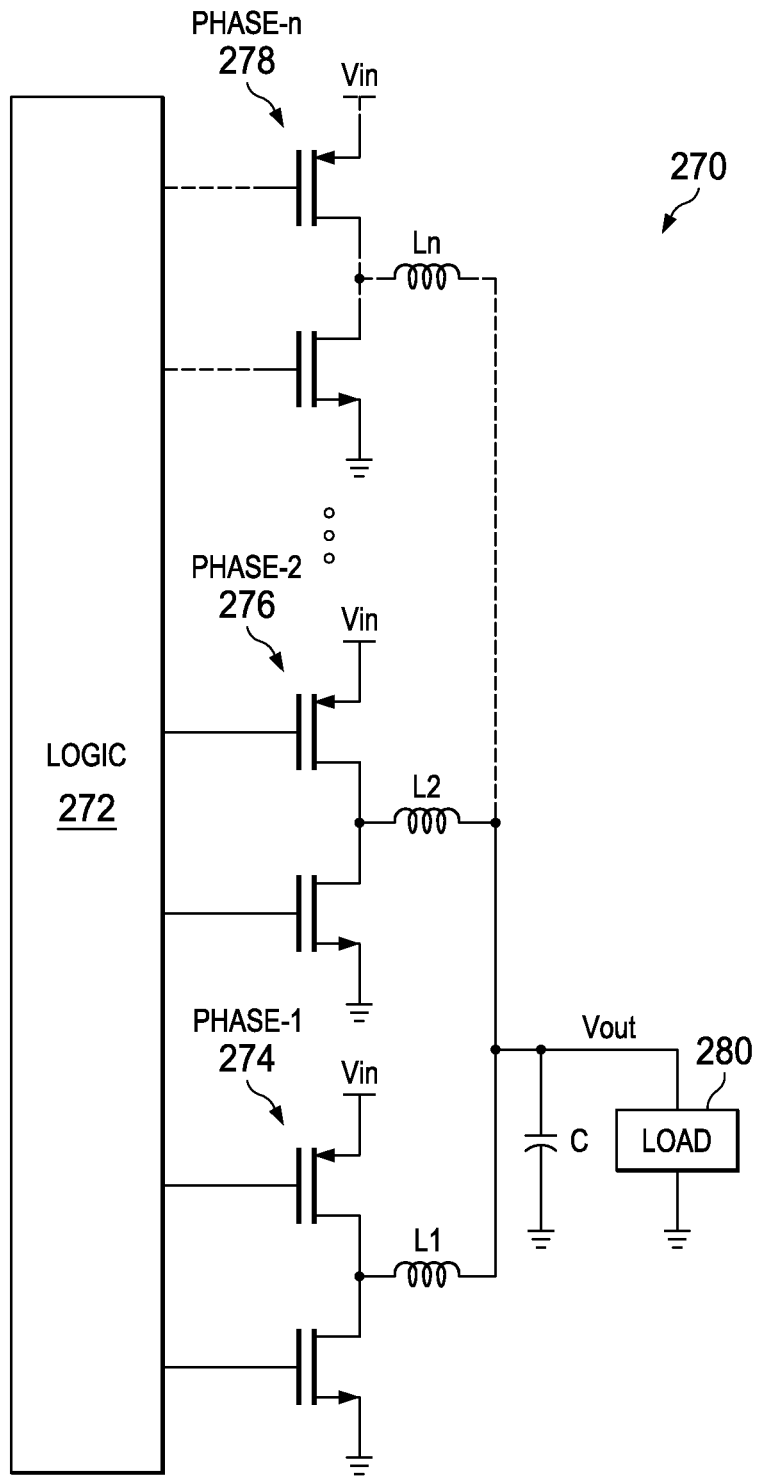
FIG. 2b is a schematic of an independent threshold undershoot reducer-controlled multiphase buck converter in accordance with example embodiments of the disclosure.

FIG. 2b is a schematic of an independent threshold undershoot reducer-controlled multiphase buck converter in accordance with example embodiments of the disclosure. The independent threshold undershoot reducer-controlled multiphase buck converter 270 includes a logic 272 block that is similar to the non-linear control logic 262a discussed above with respect to FIG. 2a.

The independent threshold undershoot reducer system logic 272 block is coupled to a number "n" of multiphase generators such as phase generator 274, phase generator 276, and phase generator 278. Phase generator 274 includes a high-side/low-side power transistor stack and an inductor L1, phase generator 276 includes a high-side/low-side power transistor stack, and phase generator 278 includes a high-side/low-side power transistor stack and an inductor Ln. In various embodiments, there are two or more phase generators in a multiphase buck converter. The logic 272 block is operable to provide non-linear control separately to each of the phase generators 274, 276, and 278. The output of each phase generator is coupled (e.g., wire-ORed together) to the load 280.

Figure 3:
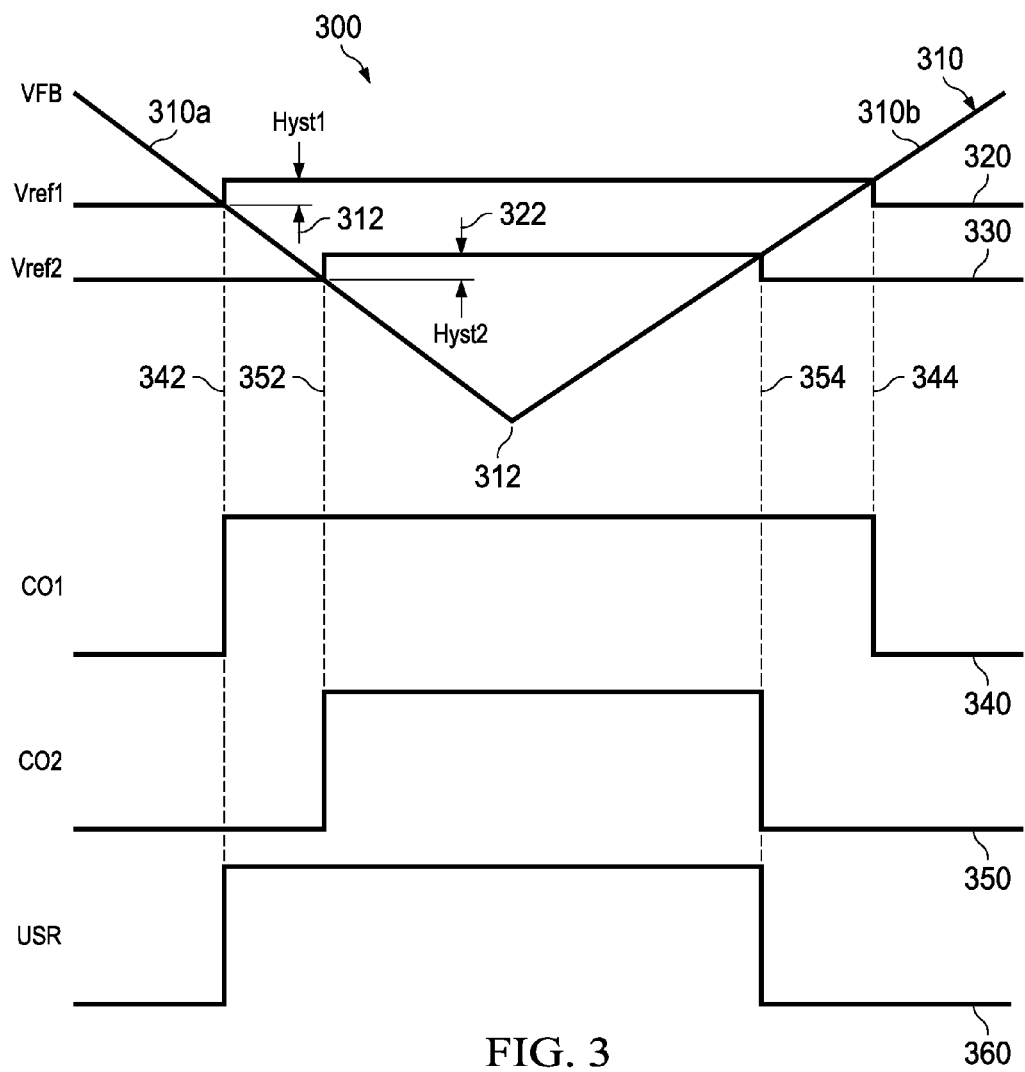
FIG. 3 is a timing diagram of independent thresholds of the independent threshold undershoot reducer of FIG. 2 in accordance with example embodiments of the disclosure.

FIG. 3 is a timing diagram of independent thresholds of the independent threshold undershoot reducer of FIG. 2 in accordance with example embodiments of the disclosure. Timing diagram 300 includes the signals VFB 310, first reference voltage (VREF1) 320, second reference voltage (VREF2) 330, CO1 (first comparator output) 340, CO2 (second comparator output) 350, and USR 360. The signals VFB 310, CO1 340, CO2 350, and USR 360 are similar to the respective signals as discussed above with respect to FIG. 2. The signal VREF1 320 is similar to the VREF_USR (described above with reference to FIG. 2), whereas the signal VREF2 330 is similar to the offset VREF_USR (also described above with reference to FIG. 2).

Signal VFB 310 is illustrated as having a negative slope portion 310a, an inflexion point 312, and a positive slope portion 310b. The first comparator 210 is operable for comparing the VFB 310 signal with the VREF1 320 signal. At time 342, the (falling) level of the signal VFB 310 falls below the level of the VREF1 320 signal. In response, the CO1 340 signal, and the USR 360 signal in turn, is asserted at (e.g., around) time 342. The assertion of the USR 360 signal causes the power converter 260 to apply power to the inductor such that, after a period of latency, the falling voltage of signal VFB eventually recovers at inflection point 312 and starts to rise again (as shown by a positive slope portion 310b of signal VFB 310).

At time 352, the (falling) level of the signal VFB 310 falls below the level of the VREF2 330 signal. The value of VREF2 330 is equal to the value of VREF1 320 minus the offset voltage (e.g., which provides a virtual "negative hysteresis") such as provided by voltage source 232. In response to the level of the signal VFB 310 falling below the level of the VREF2 330 signal and the asserted state of the CO1 340 signal, the CO2 350 signal is asserted at (e.g., around) time 342.

In the event that the VFB 310 signal does not fall below the level of VREF2 330 signal, the USR signal 360 is asserted and then de-asserted (e.g., by the state machine 218) when the VFB 310 signal rises above the VREF1 320 signal plus the hysteresis 312. The latch 220 ensures a selected minimum active duration (such as 200 ns) for the USR 360 signal.

At time 354, the (rising) level of the signal VFB 310 rises above the level of the VREF2 330 signal plus the hysteresis value 322 of the second comparator (which can be the same as or different from the hysteresis value 312 of the first comparator). In response to the level of the signal VFB 310 rising above the level of the VREF2 330 signal plus the hysteresis value 322, the CO2 350 signal is deasserted (e.g., driven low) at time 354. Also at time 354, the signal USR 360 is deasserted. Deasserting the signal USR 360 in response to the VREF2 signal (e.g., in place of deasserting the signal USR in response to the VREF1 signal) allows the USR 360 signal to be deasserted at an earlier time (e.g., time 354 as compared with time 344). Deasserting the signal USR 360 at an earlier time helps to avoid potential overshoot of the regulated output voltage (as discussed below with respect to FIG. 4 and FIG. 5), which saves power.

At time 344, the (rising) level of the signal VFB 310 rises above the level of the VREF1 320 signal plus the hysteresis value 312 of the first comparator. In response to the level of the signal VFB 310 rising above the level of the VREF1 320 signal plus the hysteresis value 312, the CO1 340 signal is deasserted (e.g., driven low) at time 354. The deassertion of the CO1 340 signal, for example, affects the control signals of internal latches of the second comparator latch 240 such that the cycle of the assertion and deassertion of the signal USR 360 is repeated cyclically as discussed below with respect to FIG. 4 and FIG. 5.

Figure 4:
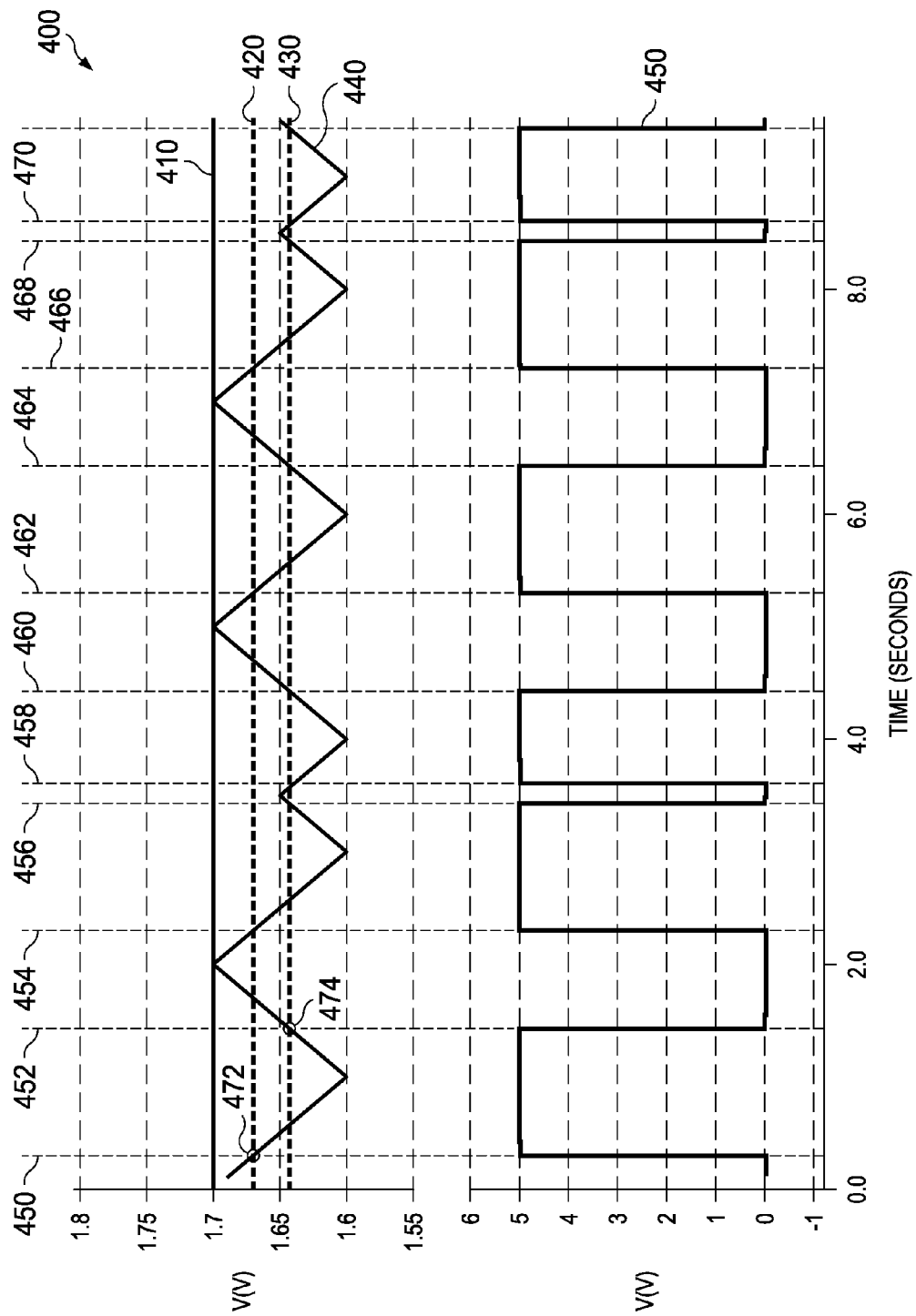
FIG. 4 is a timing diagram of a simulation of independent thresholds of the independent threshold undershoot reducer of FIG. 2 using "negative" hysteresis in accordance with example embodiments of the disclosure.

FIG. 4 is a timing diagram of a simulation of a first set of independent thresholds of the independent threshold undershoot reducer of FIG. 2 in accordance with example embodiments of the disclosure. Timing diagram 400 includes the regulated target voltage (RTV) signal 410, first reference voltage (VREF1) 420, second reference voltage (VREF2) 430, VFB 440, and USR 450. The RTV signal 410 is a target voltage of undershoot reducer circuitry, such as undershoot reducer 140. The signals VREF1 420, VREF2 430, VFB 440, and USR 450 are similar to the respective signals as discussed above with respect to FIG. 3. Simulation 400 generally illustrates the operation of undershoot reduction circuitry such as described above with respect to FIG. 2.

The simulation 400 operates using an undershoot reduction system 200 having a USR couple-power (e.g., "turn on" power) threshold 472 that is higher than the USR decouple-power (e.g., "turn off" power) threshold 474. The couple-power threshold 472 being higher than the USR decouple-power threshold 474 provides virtual (e.g., mimics the effects of) "negative hysteresis" that would apparently occur if a single comparator was being used by the undershoot reduction system 200.

The signal RTV 410 is a target voltage of undershoot reducer circuitry, which regulates the signal VFB 440. The signal VFB 440 is regulated such that the level of signal VFB 440 is maintained at a level relatively close to, but not exceeding, the level of RTV 410 (which here is substantially constant, but can vary in various applications).

Initially, the signal VFB 440 has a negative slope. At time 450, the signal VFB 440 crosses (e.g., falls below) the signal VREF1 420 (at couple-power threshold 472). When the signal VFB 440 falls below the signal VREF1 420, the signal USR 450 is asserted, which causes the power converter (e.g., that generates the signal VFB 440) to apply power to the inductor L. Due to the nature of the power converter (e.g., a buck converter), the application of power to the inductor does not immediately cause a rise in the voltage the signal VFB 440. Accordingly, the signal VFB 440 falls below the signal VREF2 430 and subsequently the signal VFB 440 starts to rise (now having a positive slope) due to the application of power applied in response to the assertion of the signal USR 450.

At time 452, the signal VFB 440 crosses (e.g., rises above) the signal VREF2 430 (at decouple-power threshold 474). When the signal VFB 440 rises above the signal VREF2 430, the signal USR 450 is deasserted, which causes the power converter to decouple the applied power from the inductor L. Due to the nature of the power converter, the decoupling of the applied power to the inductor does not immediately cause a reduction in the voltage the signal VFB 440. Accordingly, the signal VFB 440 continues to rise, rising above the signal VREF1 420, and approaches the signal RTV 410. Because of the decoupling of applied power from the energy elements of the power converter at time 452, the signal VFB 440 starts to fall as the voltage level of the signal VFB 440 reaches a voltage level approximately equal to the voltage level of RTV 410.

At time 454, the signal VFB 440 falls below the signal VREF1 420. When the signal VFB 440 falls below the signal VREF1 420, the signal USR 450 is asserted, which again causes the power converter to apply power to the inductor L. Due to the nature of the power converter, the application of power to the inductor does not immediately cause a rise in the voltage the signal VFB 440. Accordingly, the signal VFB 440 falls below the signal VREF2 430 and subsequently the signal VFB 440 starts to rise (now having a positive slope) due to the application of power applied in response to the assertion of the signal USR 450.

At time 456, the signal VFB 440 rises above the signal VREF2 430. When the signal VFB 440 rises above the signal VREF2 430, the signal USR 450 is deasserted, which causes the power converter to decouple the applied power from the inductor L.

At time 458, the signal VFB 440 falls below the signal VREF2 430 (without first rising above the signal VREF1 420) The signal VFB 440 can fall below the signal VREF2 420 (e.g., without first rising above the signal VREF1 420) due to, for example, an instantaneous increase in load (and no coupled power to the inductor L). When the signal VFB 440 falls below the signal VREF2 430 (at time 458), the signal USR 450 is asserted, which again causes the power converter to apply power to the inductor L. Due to the nature of the power converter, the application of power to the inductor does not immediately cause a rise in the voltage the signal VFB 440. Accordingly, the signal VFB 440 falls below the signal VREF2 430 and subsequently the signal VFB 440 starts to rise (now having a positive slope) due to the application of power applied in response to the assertion of the signal USR 450.

At time 460, the signal VFB 440 rises above the signal VREF2 430. When the signal VFB 440 rises above the signal VREF2 430, the signal USR 450 is again deasserted, which causes the power converter to decouple the applied power from the inductor L. The signal VFB 440 continues to rise, rising above the signal VREF1 420, and approaches the signal RTV 410. Because of the decoupling of applied power from the energy elements of the power converter at time 452, the signal VFB 440 starts to fall as the voltage level of the signal VFB 440 reaches a voltage level approximately equal to the voltage level of RTV 410.

At time 462, the signal VFB 440 falls below the signal VREF1 420 and in response the signal USR 450 is asserted, which again causes the power converter to apply power to the inductor L. The signal VFB 440 falls below the signal VREF2 430 and subsequently the signal VFB 440 starts to rise.

At time 464, the signal VFB 440 rises above the signal VREF2 430 and in response the signal USR 450 is deasserted, which causes the power converter to decouple the applied power from the inductor L. The signal VFB 440 continues to rise, rising above the signal VREF1 420, and approaches the level of the signal RTV 410 where the signal VFB 440 again starts to fall.

At time 466, the signal VFB 440 falls below the signal VREF1 420 and in response the signal USR 450 is asserted, which again causes the power converter to apply power to the inductor L. The signal VFB 440 falls below the signal VREF2 430 and subsequently the signal VFB 440 starts to rise.

At time 468, the signal VFB 440 rises above the signal VREF2 430 and in response the signal USR 450 is deasserted, which causes the power converter to decouple the applied power from the inductor L. Again, due to changing load factors for example, the signal VFB 440 starts to fall without having reached the voltage level of the signal VREF1 420.

At time 470, signal VFB 440 falls below the signal VREF2 430 (without having risen above the level of the signal VREF1 420), and in response the signal USR 450 is asserted, which again causes the power converter to apply power to the inductor L. Subsequently, the signal VFB 440 continues to fall and then starts to rise (now having a positive slope) due to the application of power applied in response to the assertion of the signal USR 450.

Accordingly, the logic of the state machine 218 is responsive to assert the signal USR 450 in response to the signal VFB 440 falling below the signal VREF1 420. The logic of the undershoot voltage reducer is also responsive to assert the signal USR 450 in response to signal VFB 440 falling below the signal VREF2 430 without first having risen above the level of the signal VREF1 420.

Figure 5:
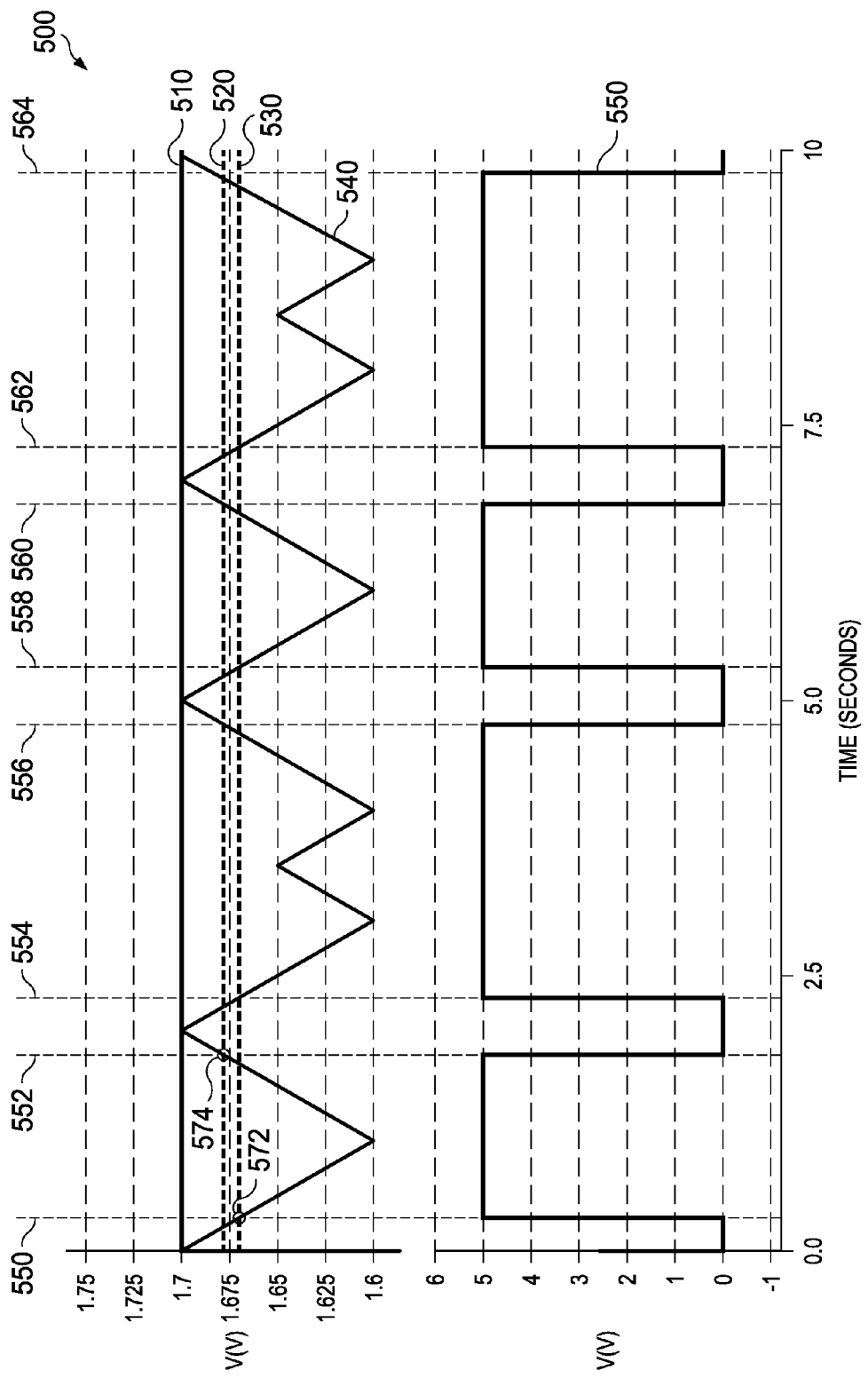
FIG. 5 is a timing diagram of a simulation of independent thresholds of the independent threshold undershoot reducer of FIG. 2 using a single comparator in accordance with example embodiments of the disclosure.

FIG. 5 is a timing diagram of a simulation of independent thresholds of the independent threshold undershoot reducer of FIG. 2 using a single comparator in accordance with example embodiments of the disclosure. Timing diagram 500 includes the signals maximum voltage (RTV) 510, first reference voltage (VREF1) 520, second reference voltage (VREF2) 530, VFB 540, and USR 550. The signal RTV 510 is a target voltage of undershoot reducer circuitry, such as undershoot reducer 140. The signals VREF1 520, VREF2 530, VFB 540, and USR 550 are similar to the respective signals as discussed above with respect to FIG. 3. Simulation 500 generally illustrates the operation of undershoot reduction circuitry such as described above with respect to FIG. 2.

In contrast to the simulation 400 using the undershoot reduction system 200, the simulation 500 operates using an undershoot reduction system having a USR decouple-power threshold 574 that is higher than the USR couple-power threshold 572. The decouple-power threshold 574 being higher than the USR couple-power threshold 572 provides virtual (e.g., mimics the effects of) additional "positive hysteresis" that would appear to occur if (e.g., only) a single comparator were used by the undershoot reduction system.

The signal RTV 510 is a target voltage of undershoot reducer circuitry. The signal VFB 540 is regulated such that the level of signal VFB 540 is maintained at a level relatively close to the level of RTV 510 (which here is substantially constant, but can vary in various embodiments).

Initially, the signal VFB 540 has a negative slope. At time 550, the signal VFB 540 falls below the signal VREF2 530 (at couple-power threshold 572). When the signal VFB 540 falls below the signal VREF2 530, the signal USR 550 is asserted, which causes the power converter (e.g., that generates the signal VFB 540) to apply power to the inductor L. Due to the nature of the power converter (e.g., a buck converter), the application of power to the inductor does not immediately cause a rise in the voltage the signal VFB 540. Accordingly, the signal VFB 540 continues to fall but recovers (now having a positive slope) due to the application of power applied in response to the assertion of the signal USR 550.

At time 552, the signal VFB 540 rises above the signal VREF1 520 (at decouple-power threshold 574). When the signal VFB 540 rises above the signal VREF2 5200, the signal USR 550 is deasserted, which causes the power converter to decouple the applied power from the inductor L. Due to the nature of the power converter, the decoupling of the applied power to the inductor does not immediately cause a reduction in the voltage the signal VFB 540. Accordingly, the signal VFB 540 continues to rise and approaches the signal RTV 510. Because of the decoupling of applied power from the energy elements of the power converter at time 552, the signal VFB 540 starts to fall as the voltage level of the signal VFB 540 reaches a voltage level approximately equal to the voltage level of RTV 510.

At time 554, the signal VFB 540 falls below the signal VREF1 520 firstly, and then the signal VREF2 530 secondly. When the signal VFB 540 falls below the signal VREF2 530, the signal USR 550 is asserted, which again causes the power converter to apply power to the inductor L. Accordingly, the signal VFB 540 continues to fall but then recovers (now having a positive slope) due to the application of power applied in response to the assertion of the signal USR 550. Again, due to changing load factors for example, the signal VFB 540 starts to fall again without having reached the voltage level of the signal VREF2 530. As the application of power applied in response to the assertion of the signal USR 550 continues, the signal VFB 540 (after some latency) recovers and begins to rise again. The signal USR 550 remains asserted during this time (e.g., from time 554 to time 556).

At time 556, the signal VFB 540 rises above the signal VREF1 520. When the signal VFB 540 rises above the signal VREF1 520, the signal USR 550 is deasserted, which causes the power converter to decouple the applied power from the inductor L. Accordingly, the signal VFB 540 approaches the level of the signal RTV 510 and subsequently starts to fall.

At time 558, the signal VFB 540 falls below the signal VREF2 530. When the signal VFB 540 falls below the signal VREF2 520, the signal USR 550 is asserted, which again causes the power converter to apply power to the inductor L. Accordingly, the signal VFB 540 falls below the signal VREF2 530 and subsequently the signal VFB 540 starts to rise (now having a positive slope) due to the application of power applied in response to the assertion of the signal USR 550.

At time 560, the signal VFB 540 rises above the signal VREF1 520. When the signal VFB 540 rises above the signal VREF1 520, the signal USR 550 is deasserted, which causes the power converter to decouple the applied power from the inductor L. Accordingly, the signal VFB 540 approaches the level of the signal RTV 510 and subsequently starts to fall.

At time 562, the signal VFB 540 falls below the signal VREF2 530. When the signal VFB 540 falls below the signal VREF2 520, the signal USR 550 is asserted, which again causes the power converter to apply power to the inductor L. Accordingly, the signal VFB 540 falls below the signal VREF2 530 and subsequently the signal VFB 540 starts to rise (now having a positive slope) due to the application of power applied in response to the assertion of the signal USR 550. Again, due to changing load factors for example, the signal VFB 540 starts to fall without having reached the voltage level of the signal VREF2 530. As the application of power applied in response to the assertion of the signal USR 550 continues, the signal VFB 540 (after some latency) recovers and begins to rise again. The signal USR 550 remains asserted during this time (e.g., from time 562 to time 564).

Accordingly, the state machine of the undershoot voltage reducer (e.g., state machine 250) is responsive to assert the signal USR 550 in response to the signal VFB 540 falling below the signal VREF1 520 and to assert the signal USR 550 in response to signal VFB 540 falling below the signal VREF2 530 without having risen above the level of the signal VREF1 520.

In an embodiment, a controller (e.g., such as a microcontroller or a digital signal processor) is used to control one or more attributes of the undershoot reduction circuitry. Some of the variables are software programmable, which allows more flexibility for implementing the disclosed control schemes and provides an enhanced ability to adaptively adjust to dynamically changing conditions for optimized system performance. Other variables can be programmed during the manufacturing process (e.g., to compensate for lot characteristics) by trimming trim-able resistors to increase operational stability and accuracy.

In various embodiments, the above described components can be implemented in hardware or software, internally or externally, and share functionality with other modules and components as illustrated herein. For example, the switching portions of the power converter can be implemented outside of a device and/or substrate upon which the undershoot reduction circuitry is formed.

The various embodiments described above are provided by way of illustration only and should not be construed to limit the claims attached hereto. Those skilled in the art will readily recognize various modifications and changes that could be made without following the example embodiments and applications illustrated and described herein, and without departing from the true spirit and scope of the following claims.

What is claimed is:
1. A circuit for voltage undershoot control, comprising:
a first comparator operable for comparing an indication of a power supply voltage output against a first threshold;
a second comparator operable for comparing an indication of the power supply voltage output against a second threshold; and a controller operable for generating a first power control signal to turn on a charging transistor to raise the power supply voltage output when the indication of the power supply voltage output indicates a falling power supply voltage output and crosses the first threshold when the power supply voltage output has a first slope and to turn off the charging transistor before the indication of the power supply voltage output crosses the second threshold when the power supply voltage output has a second slope opposite in direction to the first slope, wherein the first threshold is higher than the second threshold.

2. The circuit of claim 1, wherein the controller is operable for generating a second power control signal to raise the power supply voltage when the indication of the power supply voltage output crosses the second threshold when the power supply voltage output has the first slope.

3. The circuit of claim 2, wherein the controller is operable for generating an undershoot reduction control signal in response to the first power control signal and the second power control signal.

4. The circuit of claim 1, wherein the first slope is a negative slope and the second slope is a positive slope.

5. The circuit of claim 1, wherein the second threshold is lower than the first threshold.

6. The circuit of claim 5, wherein the first power control signal is generated to raise the power supply voltage output for at least a selected period of time.

7. The circuit of claim 2, wherein the first power control signal is responsive to a first comparator latch for latching an output of the first comparator and is responsive to a second comparator latch for latching an output of the second comparator.

8. The circuit of claim 7, wherein the controller includes a state machine responsive to signals of the first and second comparator latches.

9. The circuit of claim 1, wherein the first threshold is higher than the second threshold, wherein the first threshold is equal to a first voltage reference signal, and wherein the second threshold is equal to the sum of a second voltage reference signal and a hysteresis voltage of the second comparator.

10. A voltage regulation system, comprising:
a power supply operable for generating a power supply voltage output;
a first comparator operable for comparing an indication of the power supply voltage output against a first threshold;
a second comparator operable for comparing an indication of the power supply voltage output against a second threshold; and
a controller operable for signaling the power supply to raise the power supply voltage output when the indication of the power supply voltage output indicates a falling power supply voltage output and crosses the first threshold when the power supply voltage output has a first slope and to lower the power supply voltage output when the indication of the power supply voltage output crosses the second threshold when the power supply voltage output has a second slope opposite in direction to the first slope, wherein the first threshold is a undershoot reference voltage and wherein the second threshold is equal to the first threshold voltage minus a voltage offset plus a hysteresis value of the second comparator.

11. The system of claim 10, wherein the power supply includes a multiphase buck converter.

12. The system of claim 10, wherein the power supply is operable for raising the power supply voltage output by coupling power to an inductor and for lowering the power supply voltage output by decoupling power from the inductor.

13. The system of claim 12, wherein power is coupled to the inductors by closing a respective FET (field-effect transistor) transistor and power is decoupled from the inductor by opening the respective FET transistor.

14. A method, comprising:
comparing an indication of a power supply voltage output against a first threshold;
comparing an indication of the power supply voltage output against a second threshold; and
generating a power control signal to turn on a charging transistor to raise the power supply voltage output when the indication of the power supply voltage output indicates a falling power supply voltage output and crosses the first threshold when the power supply voltage output has a first slope and to turn off the charging transistor when the indication of the power supply voltage output crosses the second threshold when the power supply voltage output has a second slope opposite in direction to the first slope, wherein the first threshold is higher than the second threshold.

15. The method of claim 14, wherein the power control signal is generated to raise the power supply voltage when the indication of the power supply voltage output rises above the second threshold.

16. The method of claim 14, wherein the first slope is a negative slope and the second slope is a positive slope.

17. The method of claim 14, wherein the power control signal raises the power supply voltage output by coupling power to an inductor of the power supply when the indication of the power supply voltage output indicates a falling power supply voltage output.

* * * * *